May 13, 1952 J. A. RICHARDS, JR 2,596,868
ROUTING MACHINE
Filed Oct. 28, 1950 2 SHEETS—SHEET 1
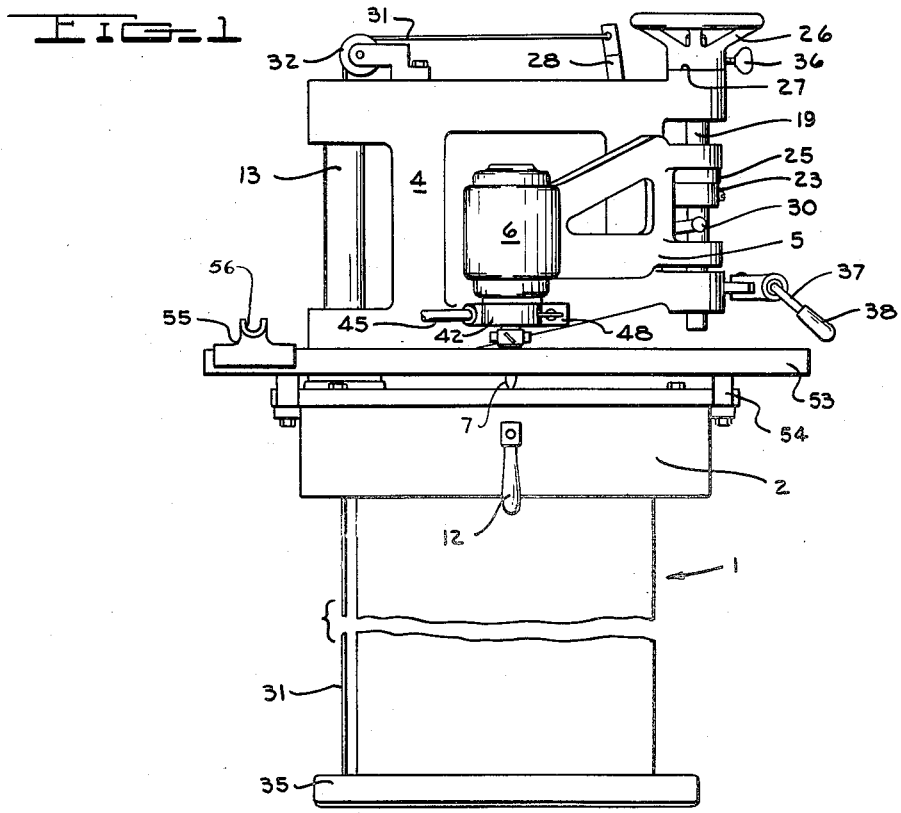
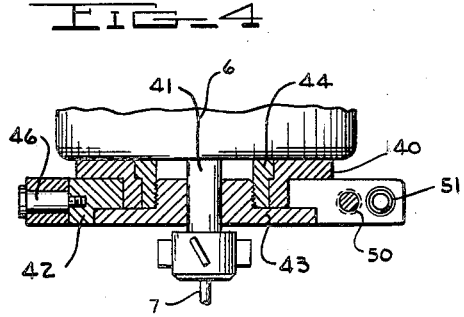
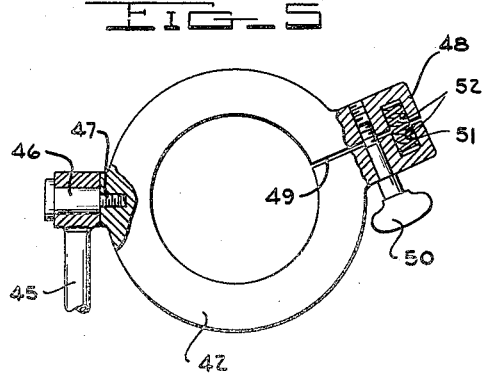
INVENTOR.
JOHN A. RICHARDS, JR.
BY
ATTORNEY

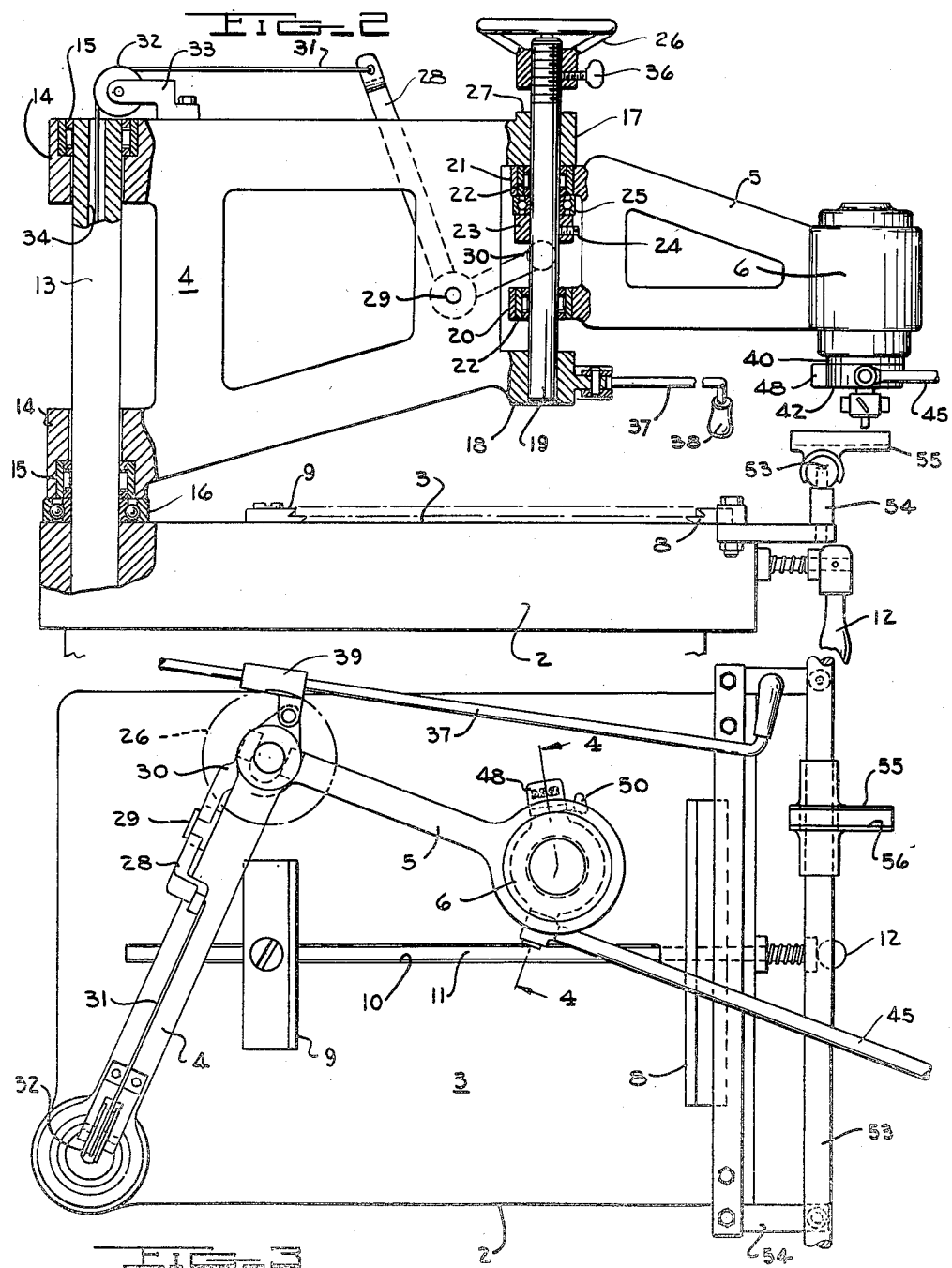

Patented May 13, 1952

2,596,868

UNITED STATES PATENT OFFICE 2,596,868

ROUTING MACHINE

John A. Richards, Jr., Kalamazoo, Mich., assignor to J. A. Richards Company, Kalamazoo, Mich., a partnership Application October 28, 1950, Serial No. 192,711

3 Claims. (Cl. 90—15)

This invention relates to routing machines and has particular reference to a routing machine for routing printing plates or the like.

A principal object of the invention is to provide a new and improved control means for a routing machine.

A further object of the invention is to provide a routing machine having a control rod associated with the motor unit or router spindle head and which control rod may be secured in any adjusted radial position relative to the motor unit or spindle head.

Other and further objects of the invention will be apparent from the following description and claims and may be understood by reference to the accompanying drawings, of which there are two sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a front elevational view of a routing machine embodying my invention;

Fig. 2 is a fragmentary side elevational view of the machine shown in Fig. 1, with parts thereof broken away;

Fig. 3 is a top plan view of the machine;

Fig. 4 is a fragmentary sectional view taken along lines 4—4 of Fig. 3; and

Fig. 5 is a top plan view of the split ring assembly with parts thereof broken away.

The routing machine constructed according to the principles of my invention may comprise a base 1 having a table 2 provided with a work supporting surface 3, a first arm 4 pivotally mounted on the table 2, a second or outer arm 5 pivoted to the free end of the arm 4, a motor unit or router spindle head 6 carried by the outer end of the arm 5 and having a routing tool 7 depending therefrom, and clamping means on the table 2 comprising a fixed two step toothed clamping jaw 8 and a movable two step toothed jaw 9 for clamping plates of various sizes and shapes on the work supporting surface 3. The clamping jaw 9 is movable within a groove or slot 10 in the table 2 by means of a rod 11 controlled by a handle 12 at the front of the table 2. The clamping means shown are for purposes of illustration only and form no part of the present invention.

The arm 4 is pivoted to the table 2 about a post 13 secured to the table at one corner thereof. The arm 4 is provided with vertically spaced ears 14 having aligned openings therein through which the post 13 extends. Roller bearings 15 are provided between the post 13 and each of the ears 14. A thrust bearing 16 is arranged between the arm 4 and the table 2.

The free end of the arm 4 is provided with vertically spaced ears 17 and 18 having aligned openings therein. A post 19 is slidable through the openings in the ears 17 and 18 of the arm 4. The arm 5 is provided with rearwardly extending, vertically spaced ears 20 and 21 having aligned openings each of which is provided with a bearing 22 through which the post 19 extends so that the arm 5 pivots freely with respect to the arm 4. A collar 23 is secured to the post 19 by means of a set screw 24. A thrust bearing 25 rests on the upper surface of the collar 23 and the projecting portion 21 of the arm 5 rests upon the thrust bearing 25.

The upper end of the post 19 is threaded and an adjustable hand wheel 26 is threaded thereon. The engagement of the hand wheel 26 with the upper surface 27 of the part 17 of the arm 4 fixes the vertical position of the arm 5. A bell crank lever 28 pivoted to the arm 4 by means of a pin 29 and having a forked end 30 engageable with the under side of the collar 23 on either side of the post 19 is operable for raising the arm 5 relative to the arm 4. The other end of the bell crank arm 28 is secured to a cable 31 which extends over a pulley 32 mounted on a bracket 33 secured to the upper surface of the arm 4. The cable 31 extends through a central opening 34 in the post 13 and is connected at its lower end to a foot pedal or treadle 35.

In Fig. 1 the arm 5 is shown in its lowermost position. It will be seen that depression of the pedal 35 will rotate the bell crank 28 in a counterclockwise direction so that the forked end 30 of the arm 28 will engage the collar 23 which is fixed to the shaft 19, whereby the arm 5 will be raised relative to the arm 4 into the position shown in Fig. 2. With the arm 5 in its upper position as shown in Fig. 2, the wheel 26 may be adjusted by means of its threaded engagement with the shaft 19, and when the desired adjustment is obtained the wheel 26 is locked by means of a thumb screw 36. When the foot pedal 35 is then released, the arm 5 and shaft 19 will move downwardly by gravity until the wheel 26 engages the surface 27. Any other suitable means, such as a pair of lock nuts threaded on to the upper end of the shaft 19, might be provided for securing vertical adjustment of the arm 5.

A control rod 37 provided with a handle 38 is pivoted to the projection 18 on the arm 4 for controlling pivotal movement of the arm 4 over the table.

The motor unit 6 is provided with a fixed collar 40 concentric with the spindle 41 to which the routing tool 7 is secured. A split ring 42 is rotatable about the collar 40 and is secured thereon by a nut 43 threaded on to an extension 44 of the motor unit 6. A control rod 45 is connected to the split ring 42 for pivotal movement about a horizontal axis by means of a pin 46 having an end 47 thereof threadedly secured to the ring 42. The rod 45 is movable with the ring 42 into any radial position of the rod relative to the axis of the motor unit.

A means is provided for tightening the split ring 42 against the collar 40 so as to prevent rotation of the ring 42 and the rod 45 relative to the motor unit. As best shown in Fig. 5, the ring 42 is provided with a laterally projecting lug 48 and the ring is split as at 49. A thumb screw 50 is slidable through one part of the split lug 48 and threadedly engages the other part of the lug so that the ring may be tightened into engagement with the collar 40. A spring 51 is provided in oppositely arranged openings 52 in both parts of the lug 48 so as to bias the ring out of tight engagement with the collar 40.

The foregoing arrangement provides for quick adjustment of the control rod 45 into any desired radial position thereof relative to the motor unit and provides a means for securing the rod in such adjusted position.

A rail 53 extends along the front of the table 2 and is secured thereto by means of brackets 54. A guide 55 is slidable along the rail 53 and is provided with an upwardly facing groove 56 adapted to receive the control rod 45. When the rod 45 is arranged in the guide 55 the machine is adapted for straight line routing in two directions. When it is desired to move the routing tool freely in any direction over the table, the guide 55 is dispensed with and the rod 45 moved into the desired radial position and locked therein. Both the control rod 45 and the control rod 37 extend toward the front of the machine and are adjacent the rail 53 so as to facilitate control of the routing tool.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A router comprising a horizontal table, a first arm mounted on said table for pivotal movement in a horizontal path, a second arm pivotally connected to the free end of said first arm for pivotal movement of said second arm in a horizontal path, a motor unit carried by said second arm and having a routing tool depending therefrom and driven thereby, and manual control means for controlling pivotal movement of said second arm, said control means comprising a collar fixed to said motor unit, a split ring rotatably journalled on said collar for rotation about a vertical axis, a control rod connected to said split ring for pivotal movement relative thereto in a vertical plane and for pivotal movement with said split ring about said collar, releasable means for securing said split ring in tight engagement with said collar for releasably securing said split ring against rotation about said collar whereby said control rod may be secured in any radial position relative to said motor unit, and spring means biasing said split ring out of said tight engagement with said collar.

2. A router comprising a table, a first arm mounted on said table for pivotal movement in a horizontal path, a second arm pivotally connected to the free end of said first arm for pivotal movement of said second arm in a horizontal path, a housing carried by said second arm and having a routing tool depending therefrom, and manual control means for controlling pivotal movement of said second arm, said control means comprising a collar fixed to said housing, a split ring rotatably journalled on said collar, a control rod connected to said split ring for pivotal movement relative thereto in a vertical plane and for pivotal movement with said split ring about said collar, and means for releasably securing said split ring against rotation about said collar whereby said control rod may be secured in any radial position relative to said housing.

3. A router comprising a horizontal table, a first arm mounted on said table for pivotal movement in a horizontal path, a second arm pivotally connected to the free end of said first arm for pivotal movement of said second arm in a horizontal path, a motor unit carried by said second arm and having a routing tool depending therefrom and driven thereby, and means for controlling movement of said second arm comprising a collar on said motor unit, a split ring rotatably disposed about said collar for rotation about a vertical axis, a control rod secured to said split ring and movable therewith about said vertical axis, and threaded means for releasably securing said split ring against rotation relative to said collar whereby said control rod may be secured in any adjusted radial position relative to said motor unit.

JOHN A. RICHARDS, Jr.

REFERENCES CITED

The following references are of record in the file of this patent:

UNITED STATES PATENTS

| Number | Name | Date |
|---|---|---|
| 1,962,524 | Richards | June 12, 1934 |